3,110,565
PREPARATION OF BORON HYDRIDES
James L. Boone, Buena Park, Calif., assignor to American Potash & Chemical Corporation, a corporation of Delaware
No Drawing. Filed June 2, 1959, Ser. No. 817,474
5 Claims. (Cl. 23—204)

This invention relates in general to the preparation of hexaborane and more particularly to the preparation of hexaborane in good yields along with lesser quantities of pentaborane-9 by the reaction of pentaborane-11 and an amine.

The Fiat Review of German Science, 1939–1946, Inorganic Section, part 1, page 129, reports that Wiberg et al. prepared $B_6H_{10}$ by the reaction of $B_5H_{11}$ with trimethylamine. The use of two moles of the trimethylamine for each mole of the $B_5H_{11}$ is said to produce one mole of $B_3H_5$ and two of an adduct, $BH_3N(CH_3)_3$, and it is indicated that two of the triborane groups rearrange to form $B_6H_{10}$.

However, it has been found that if an effort is made to prepare $B_6H_{10}$ according to the stoichiometry suggested here, the percentage of boron converted to the desired $B_6H_{10}$ is in the neighborhod of 2%. In addition, a variety of products, including heavy residues, is obtained, and it is obvious that the reaction is far more complex than that suggested by Wiberg et al.

It is therefore an object of this invention to provide a process wherein an amine is reacted with $B_5H_{11}$ to produce a high yield of $B_6H_{10}$.

Further objects and advantages of the invention, if not specifically set forth, will become apparent during the course of the description which follows:

Generally, it has been found that if the molar ratio of amine to $B_5H_{11}$ is maintained at 1.0 or less, the percentage of boron converted to $B_6H_{10}$ rises significantly beyond the results heretofore indicated possible.

The reaction is preferably carried out at low temperatures as these provide best control over the progress of the reaction. In the example below, a final temperature of $-10°$ C. was observed, but it is to be understood that this was the result of simply cooling the reactants to a temperature at which no significant reaction could be detected and thereafter allowing them to warm slowly, $-10°$ C. being the temperature ultimately reached. Where weaker bases are used, somewhat higher temperatures are satisfactory. In any event, the temperature used is not a critical feature of the invention and may be varied significantly depending upon the reactants employed. An inert, dry atmosphere is necessary, and the reactants are contacted directly one with the other.

An example is set forth below for illustrative purposes, but this is not to be interpreted as imposing limitations on the scope of the invention other than as are set forth in the appended claims.

Known samples of $B_5H_{11}$ were condensed into pyrex tubes containing the desired quantities of trimethylamine. The mixtures were warmed from $-130°$ C. to $-85°$ C. over a four-hour period and then held at $-78°$ C. for 16 hours. They were subsequently warmed to $-10°$ C. during eight hours, and the products were removed at $0°$ C. After three days at $0°$ C. the residues yielded small additional amounts of $B_2H_6$ and $B_5H_9$. The combined products were isolated by very thorough fractional distillation and identified by vapor tension measurements. Traces of hydrogen gas were removed at $-196°$ C.; $B_2H_6$ was collected between $-196$ and $-155°$ C.; $B_4H_{10}$, between $-125$ and $-105°$ C. The pentaboranes were isolated as a mixture between $-105$ and $-78°$ C. and analyzed by rapid hydrolysis; one mole of $B_5H_{11}$ was converted to one mole each of $B_4H_{10}$ and $B(OH)_3$ while the $B_5H_9$ was recovered unchanged. Hexaborane was collected between $-78$ and $-60°$ C.; the trimethylamine-borine complex, between $-50$ and $0°$ C. Residue compositions were determined by mass balance.

The formation of an adduct between $B_5H_{11}$ and $(CH_3)_3N$ was indicated when a 2:1 mixture of these reagents was held at $-78°$ C. for 16 hours. (Experiment I). From 0.656 mmole of $B_5H_{11}$ and 0.299 mmole of $(CH_3)N$ there was recovered 0.344 mmole of pentaborane-11. The remaining substance therefore had the composition $(CH_3)_3N·1.04B_5H_{11}$.

Where, in the first experiment of Table I, a 2:1 mixture of pentaborane-11 and trimethylamine reacted during a 12 hour period between $-130$ and $-10°$ C., there appeared in addition to diborane and its trimethylamine complex, significant yields of $B_4H_{10}$, $B_5H_9$, and $B_6H_{10}$, but only a trace of hydrogen was generated. The nonvolatile residue accounted for approximately 22% of the original boron and had an empirical formula of

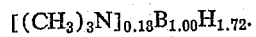

The $B_4H_{10}$—$B_5H_9$—$B_6H_{10}$ fraction amounted to about 60% of the original boron, with 19.7% attributed hexaborane alone. If the ratio of pentaborane-11 to amine is reduced to a value of one (Experiment II), the yield of volatile polyboranes is somewhat reduced and the empirical formula of the residue is $[(CH_3)_3N]_{0.20}B_{1.00}H_{1.81}$. If the ratio of reactants is further reduced to a value of approximately 0.5 (Experiment III), only 19.4% of the boron results as a product of the

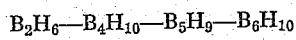

mixture, with only 2% of this attributable to hexaborane. The formula of the residue is

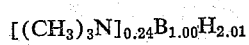

Therefore, as the ratio of $B_5H_{11}$ to $(CH_3)_3N$ decreases, the percent of boron deposited in the residue increases, as well as the ratio of the hydrogen to boron. See Table I.

The mechanism of this reaction which is consistent with the data available includes an initial removal of a $BH_3$ group from the $B_5H_{11}$ molecule leaving a radical (possibly coordinated weakly with a base) which can react with other boron hydride units to form hexaborane. Since virtually any base will complex a $BH_3$ group, at least weakly, it is believed that almost any base will induce the reaction. Pentaborane-9 is favored as a product of pentaborane-11 when the base is strong enough to form a

TABLE I

The Reaction of $B_5H_{11}$ With $(CH_3)_3N$

| Experiment Number | I | | II | | III | |
|---|---|---|---|---|---|---|
| Reactants (mmoles): | | | | | | |
| $B_5H_{11}$* | 0.656 | | 1.00 | | 0.680 | |
| $(CH_3)_3N$ | 0.299 | | 0.924 | | 1.40 | |
| Ratio of Reactants | 2.19 | | 1.08 | | 0.49 | |
| Percent $B_5H_{11}$ Consumed | 85.3 | | 100.0 | | 100.0 | |
| | mmoles | Percent B of $B_5H_{11}$ Consumed | mmoles | Percent B of $B_5H_{11}$ Consumed | mmoles | Percent B of $B_5H_{11}$ Consumed |
| Products: | | | | | | |
| $H_2$ | nil | | 0.013 | | nil | |
| $B_2H_6$ | 0.154 | 11.0 | 0.339 | 13.6 | 0.027 | 1.5 |
| $B_4H_{10}$ | 0.214 | 30.6 | 0.155 | 12.4 | 0.030 | 3.5 |
| $B_5H_9$* | 0.049 | 8.8 | 0.197 | 19.7 | 0.084 | 12.3 |
| $B_6H_{10}$ | 0.092 | 19.7 | 0.140 | 16.8 | 0.012 | 2.1 |
| $B_{10}H_{14}$ | | | | | Trace | ca 1.0 |
| $(CH_3)_3NBH_3$ | 0.227 | 8.1 | 0.684 | 13.7 | 1.00 | 29.4 |
| Total | | 78.2 | | 76.2 | | 50 |
| Empirical Formula of Residue | $[(CH_3)_3N]_{0.18}B_{1.00}H_{1.72}$ | | $[(CH_3)_3N]_{0.20}B_{1.00}H_{1.81}$ | | $[(CH_3)_3N]_{0.24}B_{1.00}H_{2.01}$ | |

*Corrected for the presence of $B_5H_9$ initially present.

stable $BH_3$ complex while hexaborane is favored when a weak base is used.

Since weaker bases tend to favor the production of $B_6H_{10}$, various of the aromatic amines are preferred to the aliphatic amines, the latter being stronger bases. Primary and secondary aliphatic amines are less preferred since they yield hydrogen and aminoborines (e.g., $(CH_3)_2NBH_2$ and $[(CH_3)_2N]_2BH$) when reacted with boron hydrides and therefore further complicate the system.

Suitable aromatic amines are N,N-dimethylaniline, N,N-diethylaniline, N,N - di-isopropylaniline, diphenylmethylamine, triphenylamine, pyridine and the methyl derivatives of pyridine (the picolines, lutidines and the collidines). Especially interesting representatives of these are the 2,6-substituted pyridines (e.g., 2,6-lutidine). Quinoline is another suitable aromatic amine.

Suitable aliphatic amines are triethylamine, tripropylamine, tributylamine and other tertiary aliphatic amines having larger alkyl groups such as trioctylamine. The larger alkyl groups generally favor $B_6H_{10}$ production and better overall boron hydride recovery since the bases having them are weaker. The mixed amines such as dimethylethylamine, methyldiethylamine and methyldibutylamine are equally satisfactory as are the difunctional amines having the general formula $R_2N(CH_2)_nNR_2$, where R is lower alkyl and n is 2–5. Preferred compounds falling within this general formula are $(CH_3)_2NCH_2CH_2N(CH_3)_2$ and $(C_2H_5)_2NCH_2CH_2N(C_2H_5)_2$. Other suitable amines fall within the scope of the general formula

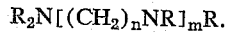

$$R_2N[(CH_2)_nNR]_mR.$$

Additional suitable compounds are the heterocyclics N-methylpyrrolidine, N-ethylpyrrolidine, N-methylpiperidine and N-ethylpiperidine.

As stated previously, the various primary and secondary amines such as methylamine, dimethylamine, butylamine and dibutylamine may be used though these are less preferred for reasons given above.

Other suitable amines are the well-known polymeric tertiary amine resins which are commercially available under various trade names. These are relatively weak bases and hence favor the production of the $B_6H_{10}$.

Obviously, many modifications and variations may be made without departing from the spirit and scope of this invention and therefore only such limitations should be imposed as are indicated in the appended claims.

I claim:

1. The process which comprises reacting at a temperature of between about $-130°$ C. and about $-10°$ C. an amine and $B_5H_{11}$, said amine and said $B_5H_{11}$ being employed in the proportion of from about .5 up to 1 mole of amine per mole of $B_5H_{11}$ to form $B_6H_{10}$, said amine being selected from the group consisting of aliphatic and aromatic amines and consisting solely of carbon, nitrogen, and hydrogen.

2. The process of claim 1 wherein the amine is a lower trialkylamine.

3. The process of claim 1 wherein the amine is a compound having an aromatic group as a part of the molecule.

4. The process of claim 1 wherein the amine is trimethylamine.

5. A process for the preparation of $B_6H_{10}$ comprising: reacting a tertiary amine, said amine consisting solely of carbon, nitrogen and hydrogen, with $B_5H_{11}$, the molar ratio of amine to $B_5H_{11}$ being no greater than about 1.

References Cited in the file of this patent

Forsyth et al.: "Abstracts of Papers," 135th Meeting, American Chemical Society. Copies mailed out March 9, 1959, page 40M.

Edwards et al.: "Papers Presented to the Section on Inorganic Chemistry," 16th International Congress of Pure and Applied Chemistry, 1958, pages 475–481.

Boone et al.: "Journal of The American Chemical Society," vol. 81, pages 1766–1767 (April 5, 1959).

Boone et al.: "Journal of The American Chemical Society," vol. 80, pages 1519–1520 (March 20, 1958).

Wiberg: "The First Review of German Science," 1939–1946, Inorganic Section, Part I, page 129 (1948).